D. E. SCHIMMEL.
ADJUSTABLE SHADE ROLLER.
APPLICATION FILED OCT. 10, 1918.
1,304,383.
Patented May 20, 1919.
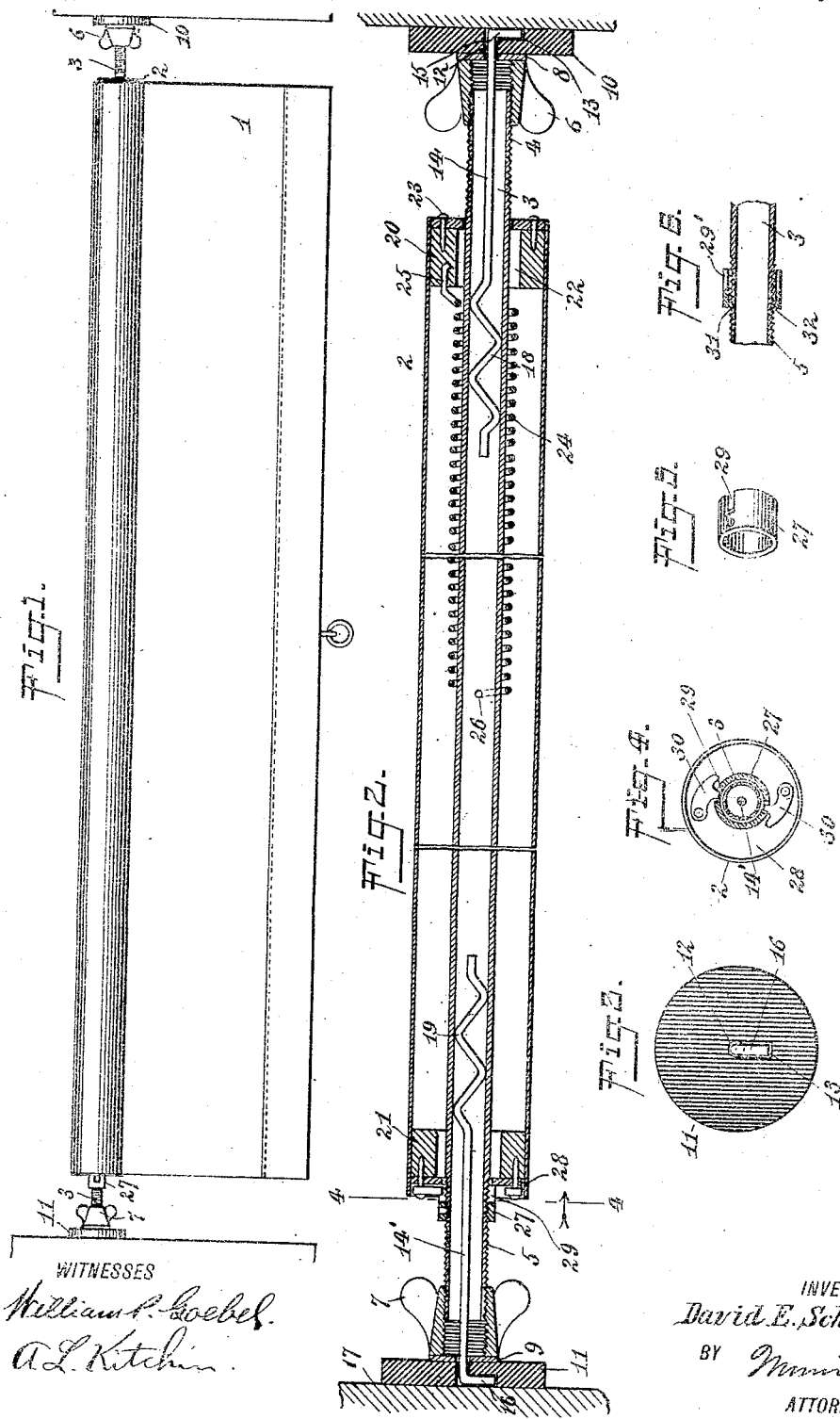
WITNESSES
William P. Goebel.
A. L. Kitchin.
INVENTOR
David E. Schimmel.
BY
ATTORNEYS

UNITED STATES PATENT OFFICE.

DAVID E. SCHIMMEL, OF BROOKLYN, NEW YORK.

ADJUSTABLE SHADE-ROLLER.

1,304,383.

Specification of Letters Patent.  Patented May 20, 1919.

Application filed October 10, 1918.  Serial No. 257,633.

*To all whom it may concern:*

Be it known that I, DAVID E. SCHIMMEL, a citizen of the United States, and a resident of the city of New York, borough of Brooklyn, in the county of Kings and State of New York, have invented a new and Improved Adjustable Shade-Roller, of which the following is a full, clear, and exact description.

This invention relates to shade rollers and has for an object the provision of an improved construction whereby the roller may be adjusted vertically, or adjusted to accommodate different size window casings.

Another object in view is the provision of improved means whereby brackets, nails and the like are eliminated while the roller is held in proper place.

A still further object of the invention is an improved arrangement whereby the adjustment of the spring may be easily made while the roller is in use.

In the accompanying drawing:

Figure 1 is a side view of a shade roller disclosing an embodiment of the invention.

Fig. 2 is a longitudinal vertical section through the roller disclosed in Fig. 1, the same being broken away so as to show the essential parts on an enlarged scale.

Fig. 3 is an end view of one of the clamping feet embodying certain features of the invention.

Fig. 4 is a sectional view through Fig. 2 on line 4—4.

Fig. 5 is a perspective view of the locking sleeve embodying certain features of the invention.

Fig. 6 is a detail fragmentary sectional view through a slightly modified form of sleeve to that shown in Fig. 5, showing how the same is secured to its supporting tube.

Referring to the accompanying drawing by numerals, 1 indicates a shade of any desired kind which is held in place by a roller 2, said roller being preferably of metal, though it may be of any material and hollow throughout. Arranged within the tube or roller 2 is a pintle or journal member 3 which may be termed a pipe for the purpose of identification. This pipe is provided with threads 4 and 5 at the end, said threads accommodating the respective nuts 6 and 7, said nuts being preferably of the wing type, though if desired they could be knurled, or provided with some other gripping surface.

From Fig. 2 it will be noted that the pipe 3 extends beyond each end of the roller and carries the nuts 6 and 7 thereon as well as washers 8 and 9 and the clamping feet 10 and 11. Each of these clamping feet is provided with an aperture 12 and a cut away portion 13 for accommodating the respective retaining rods 14 and 14'. It will be observed that these rods are bent over for forming retaining hook ends 15 and 16 which are sunk below the surface of the respective feet 10 and 11 in order that they will not engage the window casing when the parts are arranged in the position as shown in Figs. 1 and 2. It will be noted that the nuts 6 and 7 are of an appreciable length in order that the feet 10 and 11 may be adjusted toward and from the ends of pipe 3 whereby the entire device may be applied to window frames of different sizes and properly clamped thereto. In Fig. 2 the device is shown applied to a frame 17 which is of a certain width, but if it should be desired to apply the device to a slightly wider frame this may be readily done by turning the ends 6 and 7 so as to force the feet 10 and 11 upwardly to the desired distance. The pressure of the nuts against the washers 8 and 9 and against the feet not only cause the feet to grip the frame 17, but will act against the threads 4 and 5 rigidly holding the pipe 3 in a given position, whereby the tube or roller 2 may freely rotate thereon. The shoes or feet 10 and 11 may be made from any material, as for instance leather, or some other slightly yielding material whereby there will be a proper gripping action. When the parts are in their clamped position as shown in Fig. 2 they are rigidly held against movement by reason of the tension caused by the nuts 6 and 7, but when not in place on the frame the shoes 10 and 11 are held in place by the rods 14 and 14', which rods are held in place by reason of the wave construction 18 and 19 engaging the inner surface of the pipe 3.

Arranged in the ends of the roller or tube 2 are blocks 20 and 21 of any suitable material, as for instance wood, said blocks being made of such a size as to fit tightly in place and turn always with the roller or tube 2. The block 20 is provided with a bore 22 larger than the pipe 3, while the bearing washer 23 loosely fits against the pipe 3 and acts as a support therefor, said washer being secured to the block 20 by any desired means, as for instance nails or screws. The block 20 also acts as a connecting means for connecting the spring 24 to the roller or tube 2, said spring having an end 25 extending into block 20 while the opposite end is secured at 26 to the pipe 3 in any desired manner, as for instance by a pin or screw. The spring 24 is the usual spring now in common use in shade rollers, but is stretched somewhat when placed in position so as to give the pipe 3 a continuous tendency to move toward the end of the tube 2 adjacent nut 6, whereby the locking sleeve 27 adjacent the opposite end is caused to continually bear against the washer 28. Sleeve 27 may be riveted or otherwise rigidly secured to pipe 3 and is provided with diametrically opposite notches 29 for accommodating diametrically opposite pawls 30, which pawls are of usual construction now in common use and held in place by suitable pins or nails extending through washer 28 into the block 21. These nails or screws also act as means for holding the washer 28 in place, said washer being set inwardly a short distance from the end of the tube 2 in order that the pawls 30 will be limited in their outward swinging movement of the tube 2. The roller 2 and pipe 3 are hollow so that the roller 2 may accommodate the pipe and the pipe in turn accommodate the rods 14 and 14'. In addition the formation of these parts hollow reduce the weight of the entire structure to a minimum while providing a substantially fool proof structure and a very strong device throughout. The roller 2 and pipe 3 are preferably made of metal though if desired other materials could be used without departing from the spirit of the invention.

In Fig. 6 will be seen a slight modified form of locking sleeve 29', which is provided with projections 31 and 32 which are bent so as to fit into the threads 5. When these are provided they are diametrically opposite and are forced with considerable pressure into the threads so that the sleeve is locked in place by a friction between the various parts and the interlocking of the projections with the threads.

What I claim is:

1. A shade roller comprising a hollow tube, a pipe extending through said tube, a guiding member connected with the tube engaging the pipe so that the tube will be rotatably mounted in the pipe, a spring connected at one end with said pipe, means for connecting the other end with said tube, a pawl, a locking sleeve for locking the roller against rotation, and adjustable means arranged at each end of the pipe for pressing against the window casing when the device is in use.

2. A shade roller of the character described comprising a tube, a journal member extending through said tube of appreciably less diameter than the tube, means adjacent each end of the tube connected therewith acting as journal supports for the journal member, a locking sleeve connected with said journal member adjacent one end exteriorly of said supports, said sleeve having openings therein, a pivotally mounted pawl on one of said supports adapted to engage said sleeve in said openings to lock the tube, a spring having one end connected with said journal member and the other to the journal support at the end opposite that carrying the sleeve, said spring being stretched longitudinally whereby there will be a continuous tendency for said sleeve to move longitudinally of the tube toward said spring and consequently to always bear against the journal support carrying said pawls, and means for rigidly connecting the ends of said journal member to a support.

3. In a shade roller of the character described a tube, a journal member extending entirely through the tube and a short distance beyond each end thereof, a spring having one end connected with the journal member and the other with said tube, a pawl, a locking sleeve arranged adjacent one end of said tube for locking the tube against rotation, said journal member being threaded at both ends, a wing nut arranged on each of said threaded portions, a leather foot arranged at each end of said journal member acted on by said nuts for forcing the same against the support when the device is in use, and a rod for each of said outer disks extending into said journal member, said rods being slidingly positioned in said journal member and held therein by friction.

4. A shade roller of the class described comprising a hollow roller, a tube extending through said roller provided with threaded ends, a foot of yielding material arranged adjacent each end of said tube, a rod extending from each foot, each of said rods having a bent portion projecting into said tube and frictionally engaging the same so as to hold the rod and the foot connected therewith in any position in which it may be adjusted, and a nut threaded on to each end of said tube, each of said nuts being of an appreciable length so that they may be moved back and forth as desired for adjusting the position of the respective feet and for clamping said feet against an object when the roller is in position.

DAVID E. SCHIMMEL.

Copies of this patent may be obtained for five cents each, by addressing the "Commissioner of Patents, Washington, D. C."